United States Patent [19]

Matsumoto et al.

[11] Patent Number: 5,122,000

[45] Date of Patent: Jun. 16, 1992

[54] ROLLING BEARING

[75] Inventors: Yoichi Matsumoto, Yokohama; Yasuo Utsumi, Fujisawa, both of Japan

[73] Assignee: Nippon Seiko Kabushiki Kaisha, Tokyo, Japan

[21] Appl. No.: 692,443

[22] Filed: Apr. 24, 1991

[30] Foreign Application Priority Data

Apr. 27, 1990 [JP] Japan .................................. 2-114105

[51] Int. Cl.$^5$ ............................................. F16C 33/58
[52] U.S. Cl. ..................................... 384/492; 384/49; 384/625; 384/913; 384/569
[58] Field of Search ................. 384/492, 49, 625, 913, 384/565, 569

[56] References Cited

U.S. PATENT DOCUMENTS 5,030,017  7/1991  Murakami et al. .................. 384/492

FOREIGN PATENT DOCUMENTS 1-201459  8/1989  Japan .
1-234554  9/1989  Japan .
2-277764  11/1990  Japan .
1293426  5/1970  United Kingdom .
2214196  8/1989  United Kingdom .
2232684  12/1990  United Kingdom .

Primary Examiner—Lenard A. Footland
Attorney, Agent, or Firm—Basile and Hanlon

[57] ABSTRACT

A rolling bearing in which a bearing ring and/or a rolling element comprises an alloy steel wherein the hardness of a surface layer over a thickness corresponding to greater than 2% of a mean diameter of a rolling element is equal to or greater than 60 HRC and the hardness at least of the raceway surface or the rolling contact surface is equal to or greater than 64 and equal to or less than 69 HRC, and carbides of equal to or greater than 6 μm converted as the diameter of a circle are not contained in a range from the raceway surface of the rolling contact surface as far as the depth corresponding to 2% of the mean diameter of the rolling element.

11 Claims, 9 Drawing Sheets

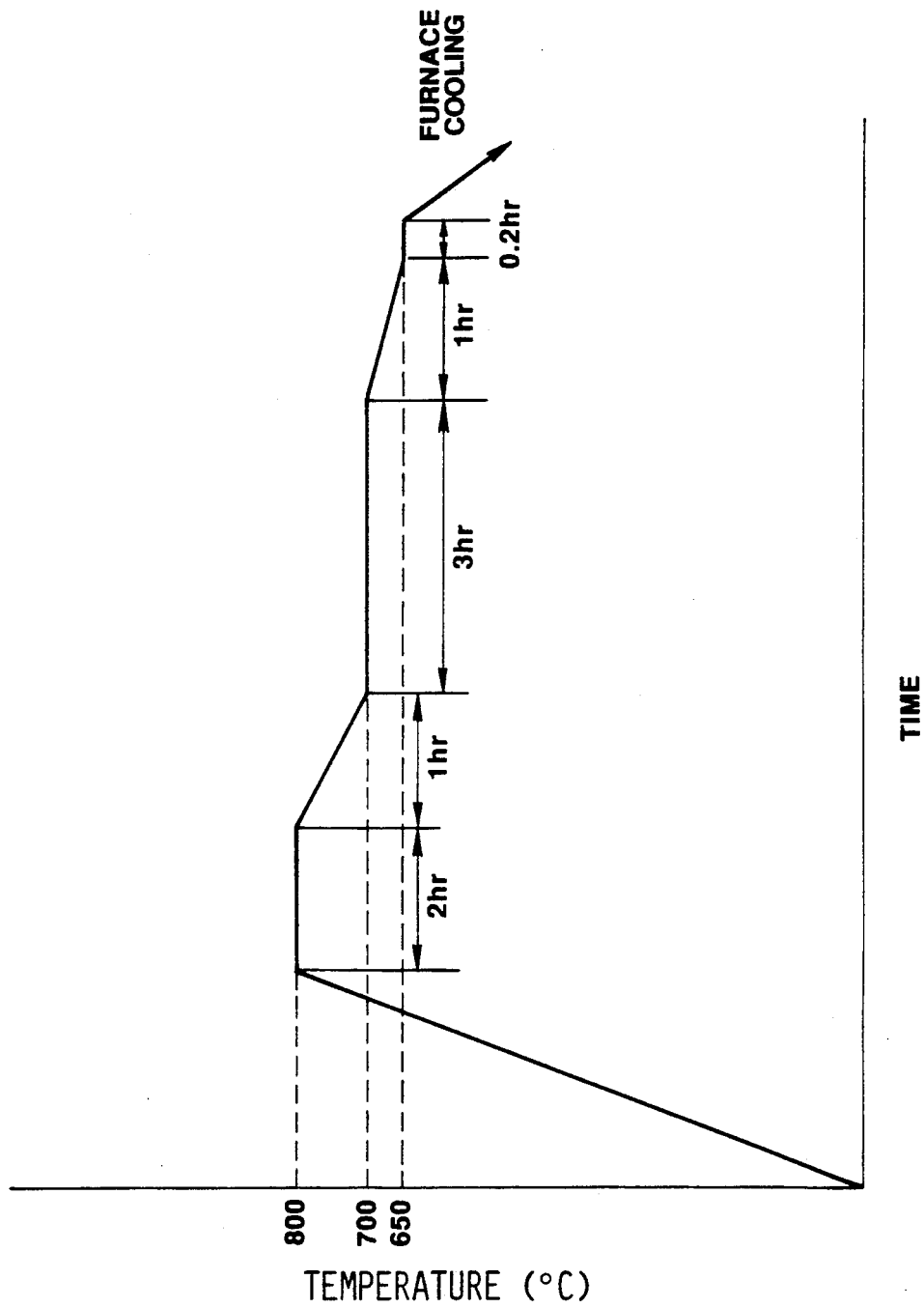

ROLLING BEARING

BACKGROUND OF THE INVENTION

1. Field of the Invention

The present invention concerns a rolling bearing used for automobiles, agricultural machines, construction machines and iron and steel equipment and, in particular, a rolling bearing which can be applied to bearings for roller followers in engines requiring long life and high seizing resistance and a tapered roller bearing requiring high PV values.

2. Description of the Art

For rolling bearings, various kinds of alloy steels, such as ball bearing steels No. 2 (SUJ-2), have been employed. For such steels, since the surface pressure loaded on ball bearings has tended to increase in recent years along with an increase of load and a reduction of size, an improved endurance life is required for a rolling bearing.

As countermeasures for improving the life of a rolling bearing, optimization of the concentration of retained austenite on a raceway surface or a rolling contact surface, reduction of non-metal impurities and the like have been conducted. The life of the rolling bearing can be extended to some extent by such countermeasures, but they are not still enough to satisfy recent demands for improving the life, particularly, of rolling bearings used for automobiles, agricultural machines, construction machines and iron and steel equipment, ball bearings for roller followers in engines, as well as tapered roll bearings requiring high PV values.

For improving the fatigue resistance of steels, there has been known a method of increasing the hardness of steels. However, in order to increase the hardness of a rolling member, a great amount of carbide-forming elements, such as Mo W and V, have to be added as in a case of high speed tool steels. As a result, since large carbides crystallized upon solidification to act as initiation points for fatigue, long life cannot always be attained for the rolling bearings.

On the other hand, there has been known a prior art method for obtaining highly tough and abrasion resistant parts by applying ion carburization to steels containing 3 to 15% by weight of Cr, as described in Japanese Patent Laid-Open Hei 1-201459 and Hei 1-234554.

However, since no consideration has been made in this prior art for applying the steels to the rolling bearings, there has been a problem that no distinct teaching is obtainable for the range of hardness of steels and the size of carbides contained in the steels which are important relative to the rolling fatigue resistance, the relationship between a rolling element and a bearing ring which is important relative to the life of the rolling bearing, as well as the average amount of retained austenite which is important relative to the dimensional stability of the rolling bearing.

A prior patent application filed on behalf of the Assignee of the present application relates to an invention directed to an alloy steel containing C: 0.3-0.5, Cr: 3-14 (each % by weight), Ti: 40 ppm and 0: 12 ppm, applied with carburizing or nitriding heat treatment, and containing 20 to 50% by weight of fine carbides with a size preferably of 0.5 to 1.5 μm and 10 to 15% by weight of retained austenite at the surface, in which stress concentration is moderated by the retained austenite thereby moderating the rolling load concentrated on the edges of dents caused by obstacles in a lubricant and to thereby prevent the occurrence of microcracks (refer to U.S. patent application Ser. No. 07/557,574). In the prior application, reduction of the mechanical property of a member caused by the increase of the retained austenite at the surface is compensated by the amount of the carbides at the surface and, as a result, long life can be maintained even under lubrication with a lubricant containing obstacles. However, the method disclosed in this prior invention is quite different from that of the present invention.

SUMMARY OF THE INVENTION

It is, accordingly, an object of the present invention to provide a rolling bearing having a long life by providing a range of hardness, a grain size of carbides and a hardness distribution that are optimum to the improvement of the rolling fatigue resistance and the long life.

Another object of the present invention is to provide a rolling bearing which is also excellent in dimensional stability by providing an optimum average concentration of retained austenite.

The foregoing objects of the present invention can be attained by a rolling bearing, wherein at least one of a bearing ring and a bearing element comprises an alloy steel in which:

(a) the hardness of a surface layer over a thickness corresponding to greater than 2% of a mean diameter of a rolling element is equal to or greater than 60 HRC and the hardness at least of the raceway surface or the rolling contact surface is equal to or greater than 64 and equal to or less than 69 HRC, and (b) carbides of equal to or greater than 6 μm converted as the diameter of circle are not contained in a range from the raceway surface or the rolling contact surface to a depth corresponding to 2% of the mean diameter of the rolling element.

The hardness of the rolling contact surface of the rolling element (hereinafter referred to as the hardness of the rolling contact surface) is preferably greater than the hardness of the raceway surface of the bearing ring (hereinafter referred to as the hardness of the raceway surface).

Further, in order that large carbides of equal to or greater than 6 μm converted as the diameter of circle are not crystallized, it is preferred that the following relationship is present for the content (% by weight) of each of alloy elements in the alloy steel:

$$(\%C) \leqq 1.12 \exp(-4.78 \times 10^{-2} ((\%Cr)+(\%Mo)+(\%V)+0.5(\%W)+0.2(\%Mn) +0.01(\%Co))) \quad (1)$$

Further, it is preferred that the average concentration of the retained austenite in at least one of the bearing ring and the rolling element is less than 10% by volume.

The present invention provides a rolling bearing having a long life and an excellent seizing resistance by providing a range of hardness, a carbide grain size and a hardness distribution that are optimum to the improvement of the rolling fatigue resistance and an increase of the rolling tearing life, as well as a rolling bearing which is also excellent in a dimensional stability by providing an optimum average concentration of retained austenite.

BRIEF DESCRIPTION OF THE DRAWINGS

FIG. 2 is a graph illustrating an annealing method for various steel species in Example 1;

DESCRIPTION OF THE PREFERRED EMBODIMENTS

Figure 1:
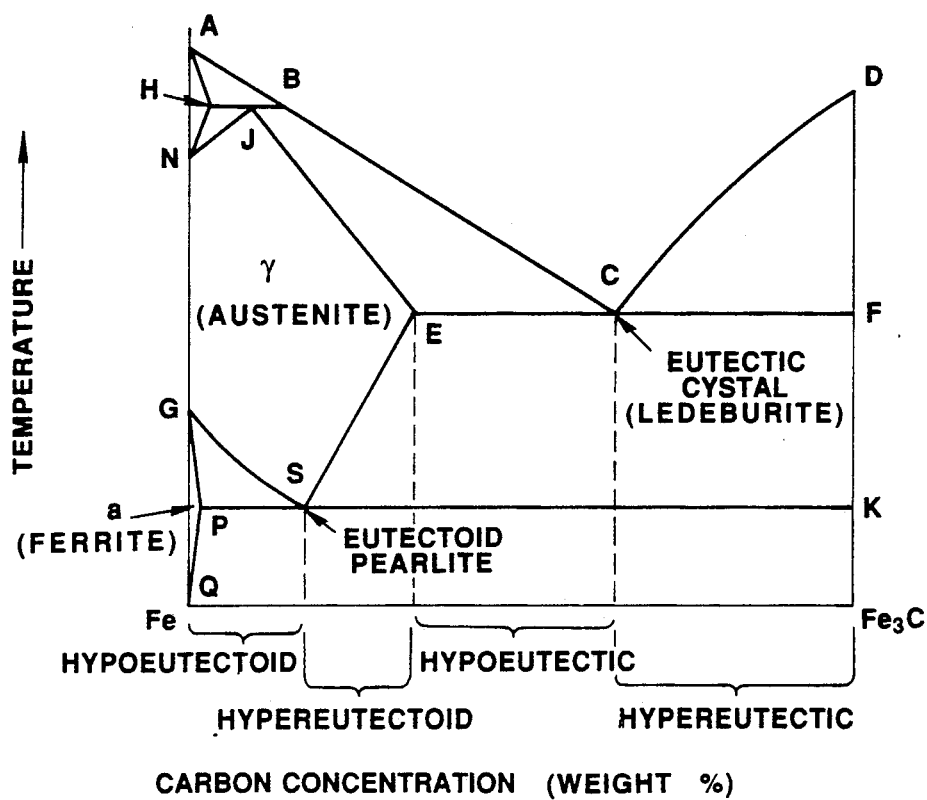
FIG. 1 is a phase diagram for Fe-Fe$_3$C.

The reasons for defining characteristics, such as the hardness, within the above-mentioned ranges will now be explained.

Hardness of the Raceway Surface or Rolling Contact Surface:

HRC in excess of 64 and less than 69

Since large surface pressures are repeatedly applied locally to the raceway surface and to the rolling contact surface, it is effective to improve the surface hardness in order to improve the rolling fatigue strength and the seizing resistance. The rolling fatigue strength is increased along with the increase of the hardness up to 64 HRC. However, if &:he hardness exceeds 64 HRC, the rolling fatigue strength is not further improved, but remains constant and, if the hardness exceeds 69 HRC, the rolling fatigue strength at the raceway surface or the rolling contact surface tends to be reduced instead.

Thickness of the Surface Layer with Greater than 60 HRC:

equal to or greater than 2% of the mean diameter for the rolling element

When a bearing ring and a rolling element are put into rolling contact, shearing stresses occur below each of the surfaces. The depth at which the value of the stress reaches a maximum is generally equal to or less than 2% of the mean diameter of the rolling element. For improving the life against the rolling fatigue, it is important that the material does not yield at the depth in which the maximum shearing stress occurs. For this purpose, it is necessary to increase the hardness at a depth in which the maximum shearing stress occurs, but the effect of increasing the rolling contact life is saturated at a hardness equal to or greater than 60 HRC. Accordingly, the critical value is defined as described above.

Size of Carbides Present in a Range from the Raceway Surface or the Rolling Contact Surface to a Depth Corresponding to 2% of the Mean Diameter for the Rolling Element:

equal or less than 6 $\mu$m converted as a diameter of circle

As described above, when the bearing ring and the rolling element are put into rolling contact, shearing stresses occur below each of the surfaces and a depth at which the stress value reaches a maximum is less than 2% of the mean diameter of the rolling element. In order to improve the contact fatigue life, it is important to reduce the size of carbides present at a depth in which the maximum shearing stress and moderate stress concentration occurs. Although the rolling fatigue life is prolonged along with the reduction of the size of the carbides, &:he effect of increasing the rolling contact life is saturated when the size of the carbides converted as the diameter of circle is equal to or less than 6 $\mu$m. In view of the foregoing, the critical value is defined as described above. The diameter converted as the diameter of circle means herein the square root of a value obtained by quadrupling the area of carbides present in the alloy steel and dividing the thus obtained product by $\pi$.

Hardness of the Rolling Contact Surface:

greater than the hardness of the raceway surface

In order to improve the rolling fatigue strength, it is necessary to define the surface hardness, the thickness of the surface layer and the characteristic values of the carbides as described above. However, in order to prolong the life of the rolling bearing, it is also important to define a certain difference between the hardness of the rolling contact surface and the hardness of the raceway surface because flaking occurs preferentially on the rolling element rather than on the bearing ring when the ball bearing is put working under the conditions of, for example, high surface pressure, insufficient formation of oil membranes, presence of both of radial and thrust forces and lubrication with oils filled with obstacles. If the hardness of the rolling contact surface is lower than that of the raceway surface, peeling occurs concentrically and in an early stage to the rolling element to shorten the life of the ball bearing. The critical value is accordingly defined as described above.

Average Concentration of Retained Austenite (vol%):

less than 10%

Retained austenite remaining in the bearing ring or the rolling element has a quasi-stable texture which gradually decomposes over the repeated elapse of years, for example, under the effect of repeated stresses, thereby bringing about expansion of the bearing ring or the rolling element which causes various disadvantages, such as vibrations. The dimensional stability of the bearing is better when the average concentration of the retained austenite present in the ball bearing (mean concentration of the retained austenite) is lower. The average concentration of the retained austenite is defined to be less than 10% so that the dimensional stability of the rolling bearing of the present invention is equivalent with or superior to that of the bearing steel No 2 (SUJ-2).

The average concentration of the retained austenite can be controlled, for example, by somewhat lowering the hardening temperature, by selecting the hardening method and by adjusting the carbon concentration.

Alloy steels that can be used in the present invention can include various known alloy steels, such as high carbon chromium bearing steels (for example, SUJ-2), case hardening steels (for example, SCr 420 H) and high speed steels for high temperature ball bearings (M 50). Referring to the heat treatment for such alloy steels, carburizing or carbo-nitriding hardening and tempering are applied to case hardening steels, and hardening and tempering are applied to alloy steels other than the case hardening steels. For steel alloys other than the case hardening alloys, a surface hardening heat treatment such as flame hardening may also be applied if necessary. In the case hardening steels, the range of hardness defined in the present invention means a value after they are subjected to the carburizing or carbonitriding hardening and tempering. Then, for the alloy steels other than the case hardening steels, the value for the range of hardness is that after hardening and tempering.

Referring to the tempering, high temperature tempering (450°-600° C.) is more preferred than low temperature tempering (for example, at 160° to 200° C.), because the retained austenite can be transformed into a martensite and, at the same time, fine carbides can be precipitated into the matrix to attain the improvement in the surface hardness and the improvement in the dimensional stability by the high temperature tempering.

Such steel alloys can be formed by casting, as well as by a known powder sintering method as disclosed, for example, in Japanese Patent Laid-Open Sho 54-116318.

The alloy steel according to the present invention contains at least one of Cr, Mo, V, W, Mn, Co and the like in accordance with the desired characteristics.

Mo is effective to form a required amount of fine carbides by chemically bonding with C on the surface and it is also effective for the improvement of hardenability. However, in order to avoid the formation of huge carbides in the raw material stage, the content of Mo is preferably less than 8% by weight and, more preferably, less than 2.0% by weight.

Mn has an important role for the improvement of hardenability. However, as the content of Mn is increased, a great amount of non-metal impurities (MnS, etc.) tend to be formed and the hardness is increased which deteriorates machinability, such as forgeability and cutting properties. Accordingly, the Mn content is desirably less than 2% by weight.

V is an element that precipitates at the crystal grain boundary and controls crystal grains from becoming coarser by making them finer and by forming fine carbides by chemically bonding with carbon in the steel. It is preferred that V is contained by less than 7% by weight since the addition of V can improve the hardness at the surface layer of the ball bearing to make the abrasion resistance satisfactory. In particular, the content of V of less than 3% by weight is desired.

W is a basically important element for obtaining performance as a high speed steel. When the element W chemically bonds with carbon, nitrogen and iron in the steel to form MC, $M_6C$ type carbides and MX, $M_6X$ type carbonitrides, the remaining portion is solubilized into the matrix to increase the abrasion resistance and, at the same time, to improve the tempering hardening and the high temperature hardness to greatly improve the cutting property. Accordingly, it is preferred that W is contained by less than 15.0% by weight.

Co is effective for increasing the heat resistance of the matrix and the improvement of the high temperature hardness in combined use with W, Mo, V and the like. Accordingly, it is preferred for Co to be contained by less than 15.0% by weight.

The carbides in the present invention means $M_6C$, $M_7C_3$, $Mo_2C$, $W_2C$, VC, $M_3C$ and the like.

In the present invention, the amount of the carbides formed at the surface is preferably from 10 to 50% expressed as the area ratio. If the amount of the carbide's present is less than 10%, it is difficult to obtain the hardness required in the present invention as described above. On the other hand, if it exceeds 50%, fine carbides tend to bond to each other to form coarser carbides.

In an inner ring, outer ring and a rolling element, in order that the size of carbides present in a range from a raceway surface or a rolling contact surface toward the inner side as far as a depth corresponding to the mean diameter of the rolling element is equal to or less than 6 μm converted as the diameter of circle, it is necessary that carbides of equal to or greater than 6 μm are not contained at least in the stage of material prior to carburization. According to the study of the present inventors, it has been found that carbides greater than 6 μm present in the material are due to the precipitating reaction of carbides. In view of an equilibrium principle, in order to avoid the precipitating reaction of the carbides, it is necessary, for example, in a $Fe-Fe_3C$ phase diagram shown in FIG. 1 that carbon at a predetermined concentration in excess of point E is not present. However, this is a condition established when the steel is cooled extremely slowly. Since equilibrium is not attained under actual casting conditions and, accordingly, the carbon concentration is higher in the portion solidified in the later stage than in the portion solidified in the early stage, carbides may occasionally be precipitated in the portion solidified during the last stage even at a lower carbon concentration of lower than the point E. Accordingly, it is necessary for mass produced steels in iron making plants, etc., that the carbon concentration is made sufficiently lower than the point E. More specifically, it is preferred to restrict the carbon concentration to be equal to or less than 1.5% by weight for non-casing hardening alloy steels. C is an element necessary for improving the hardness after hardening, but it is preferred to impose an upper limit for the content of C in order that the size of the precipitated carbides or the concentration of the retained austenite is not increased. On the other hand, in the case of the case hardening alloy steel, the carbon content is preferably about from 0.2 to 0.6% by weight in order to prevent the size of precipitated carbides from becoming larger in the stage of raw material and to improve the heat treatment productivity upon carburizing or carbonitriding.

In order not to crystallize carbides of equal to or greater than 6 μm diameter converted as the diameter of a circle, the present inventors found by experiment that steels containing various kinds of alloy elements, such as Cr, have to satisfy the conditions of the following equation (1) upon solidification in a mass production line:

$$(\%C) \leq 1.12 \exp(-4.78 \times 10^{-2} ((\%Cr)+(\%Mo)+(\%V)+0.5(\%W)+0.2(\%Mn)+0.01(\%Co))) \quad (1)$$

The present invention will now be explained by referring to the following examples.

EXAMPLE 1

Table 1 shows ingredients in each of several steel specimens. Steels shown in Table 1 were melted, refined and then continuously cast such that the size at the cross section of a steel piece was 520 mm×400 mm and, subsequently, each was then rolled into a bar of 165 φ and annealed under conditions as shown in FIG. 2.

Then, the diameter of the greatest carbide passing through a center within a cross section cut in parallel with the rolling direction was measured for such steel species. The area measured was 165×165=27225 mm².

The diameter of the greatest carbide was measured by a scanning type electron microscope and rearranged into a diameter converted as the diameter of a circle.

Further, the following value X was calculated for each steel species.

$$X = (\%C) \leq 1.12 \exp(-4.78 \times 10^{-2} ((\%Cr) + (\%Mo) + (\%V) + 0.5(\%W) + 0.2(\%Mn) + 0.01(\%Co)))$$

Figure 3:
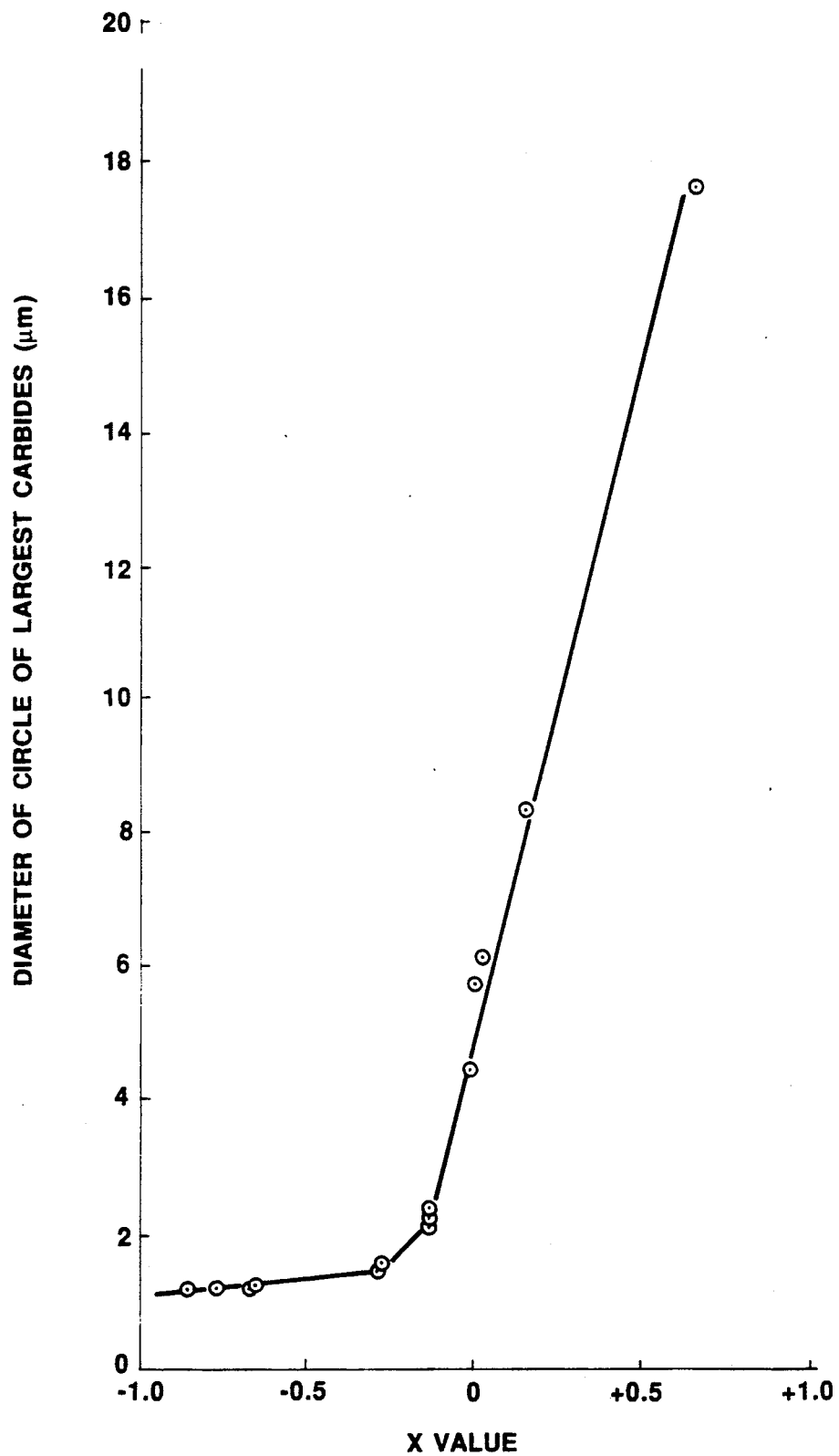
FIG. 3 is a graph illustrating a relationship between the diameter of the greatest carbides converted as the diameter of a circle and the X value.

Table 2 shows the diameter of the greatest carbide converted as the diameter of a circle and the value of X described above for each of the steel species. FIG. 3 shows a relationship between the diameter of the greatest carbide converted as the diameter of a circle (μm) and X described above.

As is apparent from FIG. 2, it can be seen that the diameter of carbides is less than 6 μm when the value X is less than zero.

From the foregoing, it can be seen that the diameter of the carbides is less than 6 μm when the formula (1) is satisfied. As a result, the diameter for the greatest carbide can be reduced to less than 6 μm by designing the content of the alloy elements as $X \leq 0$.

Further, in a case of a case hardening steel, the maximum diameter of the carbides can be reduced to less than 6 μm by adjusting the carbon concentration at the surface by changing the carburizing time and the diffusing time.

EXAMPLE 2

Figure 4:
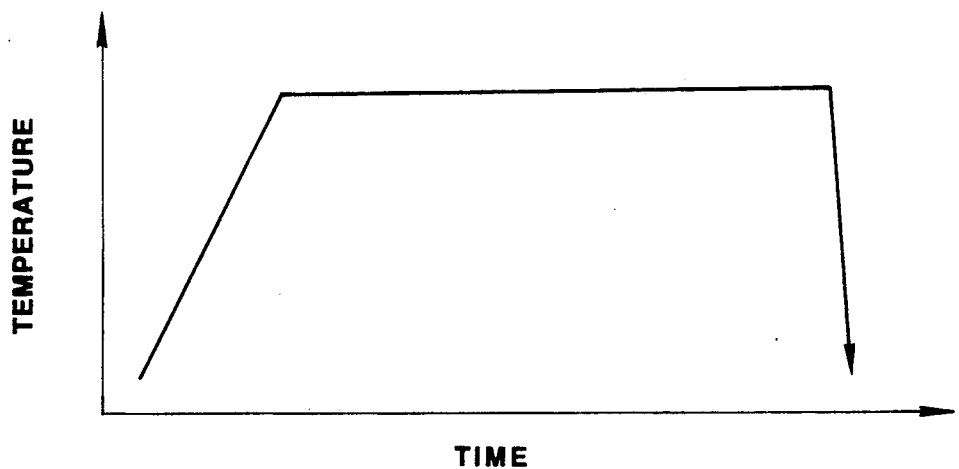
FIG. 4 is an explanatory view for the heat treatment step of ion carburizing.

Then, 11 species of steels, that is, steel species A through I, M and N satisfying the relation: $X \leq 0$ were melted, refined and then continuously cast so as to obtain steel pieces each sized 182 mm×182 mm and then rolled into bars each of 65 φ. Then, disc-like test pieces each of 60 φ, T=60 (test piece, hereinafter some time referred to simply as "T.P" in the tables) were fabricated by cutting from the bars. The test pieces were applied with carburizing hardening and tempering treatment. For carburizing hardening, ion carburizing or gas carburizing was applied. Conditions for each of the steps of temperature elevation, cleaning, carburizing, diffusion and hardening in the ion carburizing are shown in the following Table 3. FIG. 4 shows the temperature pattern in each of the steps and Table 4 shows the details for the heat processing method from carburizing to tempering.

The ion carburizing is applied as described below. In an ion carburizing furnace having a hardening oil bath, temperature in the furnace is at first elevated to an ion carburizing hardening temperature shown in Table 4 while roughly evacuating a heating chamber. Then, cleaning was applied to remove gases harmful to carburizing, such as oxygen, in the heating chamber by supplying Ar (argon) or $H_2$ (hydrogen gas) shown in Table 4 under electric glow discharge. Further, $C_3H_8$ (propane) as a carburizing gas was supplied to carburize the surface layer of the test piece under glow discharge. Then, when the supply of the carburizing gas was terminated and while maintaining the carburizing temperature, carbon intruding to the surface of the test piece was diffused so as to vary moderately toward the central portion of the test piece. Subsequently, the specimen was hardened in the oil bath to thereby complete the ion carburizing.

In Table 4, gas carburizing hardening and secondary hardening are applied in an atmosphere comprising $R_x$ gas+enrich gas, and the oxidizing treatment was conducted in air. It will be apparent that carburizing may be replaced with carbonitriding in which the carbonitriding was applied in an atmosphere comprising $R_x$ gas+enrich gas+5% ammonia gas. Then, in the heat treatment shown in Table 4, hardening was applied at an oil temperature of 60° C.

TABLE 1

| Steel Species | Chemical ingredient | | | | | | | | | |
|---|---|---|---|---|---|---|---|---|---|---|
| | C | Si | Mn | P | S | Cr | Mo | V | W | Co |
| A | 0.21 | 0.25 | 0.71 | 0.014 | 0.008 | 1.03 | — | — | — | — |
| B | 0.20 | 0.24 | 0.56 | 0.009 | 0.003 | 5.12 | 0.21 | — | — | — |
| C | 0.25 | 0.22 | 0.50 | 0.018 | 0.009 | 4.02 | 6.08 | 4.82 | 14.22 | 10.80 |
| D | 0.24 | 0.29 | 0.71 | 0.020 | 0.006 | 3.96 | 6.02 | 5.13 | 13.99 | 12.01 |
| E | 0.24 | 0.22 | 0.60 | 0.015 | 0.008 | 4.11 | 6.13 | 4.94 | 13.89 | 14.24 |
| F | 0.20 | 0.35 | 0.53 | 0.011 | 0.010 | 17.03 | 0.51 | — | — | — |
| G | 0.31 | 0.27 | 0.44 | 0.012 | 0.005 | 12.96 | — | — | — | — |
| H | 0.58 | 0.26 | 0.43 | 0.019 | 0.011 | 13.12 | — | — | — | — |
| I | 0.60 | 0.25 | 0.43 | 0.014 | 0.003 | 13.06 | — | — | — | — |
| J | 0.73 | 0.23 | 0.80 | 0.019 | 0.009 | 12.94 | 0.30 | — | — | — |
| K | 1.23 | 0.40 | 0.69 | 0.015 | 0.010 | 13.10 | 0.28 | — | — | — |
| L | 0.62 | 0.26 | 0.44 | 0.013 | 0.005 | 13.07 | — | — | — | — |
| M | 0.21 | 0.24 | 0.74 | 0.015 | 0.001 | 2.01 | 0.41 | — | — | — |
| N | 0.18 | 0.25 | 0.66 | 0.012 | 0.012 | 5.53 | 0.10 | — | — | — |

TABLE 2

| Steel Species | Diameter of the greatest carbide converted as a circle | X value |
|---|---|---|
| A | 1.2 μm | −0.85 |
| B | 1.3 μm | −0.66 |
| C | 2.3 μm | −0.14 |
| D | 2.4 μm | −0.14 |
| E | 2.2 μm | −0.14 |
| F | 1.6 μm | −0.28 |
| G | 1.5 μm | −0.29 |
| H | 4.5 μm | −0.02 |
| I | 5.8 μm | 0.00 |
| J | 8.4 μm | +0.14 |
| K | 17.7 μm | +0.64 |
| L | 6.2 μm | +0.02 |
| M | 1.2 μm | −0.78 |
| N | 1.2 μm | −0.67 |

TABLE 3

| Treatment | Temperature elevation | Cleaning | Carburizing | Diffusion | Hardening |
|---|---|---|---|---|---|
| Vacuum degree (Torr) | 0.01 | 1.3 | 2.0 | 0.005 | 0.007 |
| Glow Voltage (V) | — | 100 | 320 | — | — |
| discharge Current (A) | — | 2 | 2 | — | — |
| Gas flow rate (l/min) | — | Ar:2.5  H$_2$:1.0 | C$_3$H$_8$:0.6 | — | — |
| Time (hr) | about 1.5 | 0.33 | In accordance with conditions in Table 4 | | |

TABLE 4

| T.P. No. | Steel species | Heat treating method |
|---|---|---|
| 1 | A | Ion carburizing harding 950° C. × (carburizing 1 hr + diffusion 2 hr), Tempering 180° C. × 2 hr |
| 2 | B | Oxidizing treatment 800° C. × 0.5 hr, Gas carburizing hardening 930° C. × 3 hr, Secondary hardening 860° C. × 0.5 hr. Tempering 180° C. × 2 hr |
| 3 | C | Ion carburizing hardening 1100° C. × (Carburizing 3 hr + diffusion 1 hr), Tempering 550° C. × 1 hr × 3 times |
| 4 | D | ↑ |
| 5 | E | ↑ |
| 6 | F | Ion carburizing hardening 1100° C. × (Carburizing 4 hr + diffusion 2 hr). Tempering 450° C. × 2 hr |
| 7 | G | Ion carburizing hardening 950° C. × (Carburizing 24 hr + diffusion 1 hr). Secondary hardening 900° C. × 0.5 hr Tempering 180° C. × 2 hr |
| 8 | H | ↑ |
| 9 | I | ↑ |
| 10 | M | Gas carburizing hardening 930° C. × 12 hr, Secondary carburizing hardening 860° C. × 0.5 hr, Tempering 180° C. × 2 hr |
| 11 | N | Ion carburizing hardening 950° C. × (Carburizing 3 hr + diffusion 1 hr). Tempering 180° C. × 2 hr |
| 12 | G | Ion carburizing hardening 950° C. × (Carburizing 6 hr + diffusion 1 hr), Tempering 180° C. × 2 hr |
| 13 | ↑ | Ion carburizing hardening 950° C. × (Carburizing 12 hr + diffusion 1 hr). Tempering 180° C. × 2 hr |
| 14 | ↑ | Ion carburizing hardening 950° C. × (Carburizing 24 hr + diffusion 1 hr). Tempering 180° C. × 2 hr |
| 15 | ↑ | Ion carburizing hardening 950° C. × (Carburizing 1.5 hr + diffusion 0.75 hr). Tempering 180° C. × 2 hr |
| 16 | ↑ | ↑ |

Then, the flat surface of each of the test specimens heat treated as described above was polished to prepare a test specimen for a life test with the surface roughness of less than 0.01 Ra. The life test was conducted for each of the specimens by using a thrust tester as described in "Special Steel Manual (first edition)", edited by Electric Steel Making Institute, published by Rikogaku Co., May 25, 1965, pp 10-21. The test conditions are as shown below.

Maximum contact surface pressure ($P_{max}$) 578 kgf/mm$^2$
Repeating cycle of stress: 3000 c.p.m
Lubricant: VG68 turbine oil In the life test described above, life was judged by the presence of flaking or a crack capable of being observed with the naked eye or under a magnification glass. The life time was quantitatively expressed by an accumulated number of rotation (cycles) when 10% of the test specimens reached their life time (=$L_{10}$).

The surface hardness of the test specimen for the life test was measured by a Rockwell hardness gage and, subsequently, the thickness of the surface layer with equal to or greater than 60 HRC was measured by using a Rockwell hardness gage while polishing the surface of the test specimens successively by an ultra-high finishing grinding stone.

Figure 5:
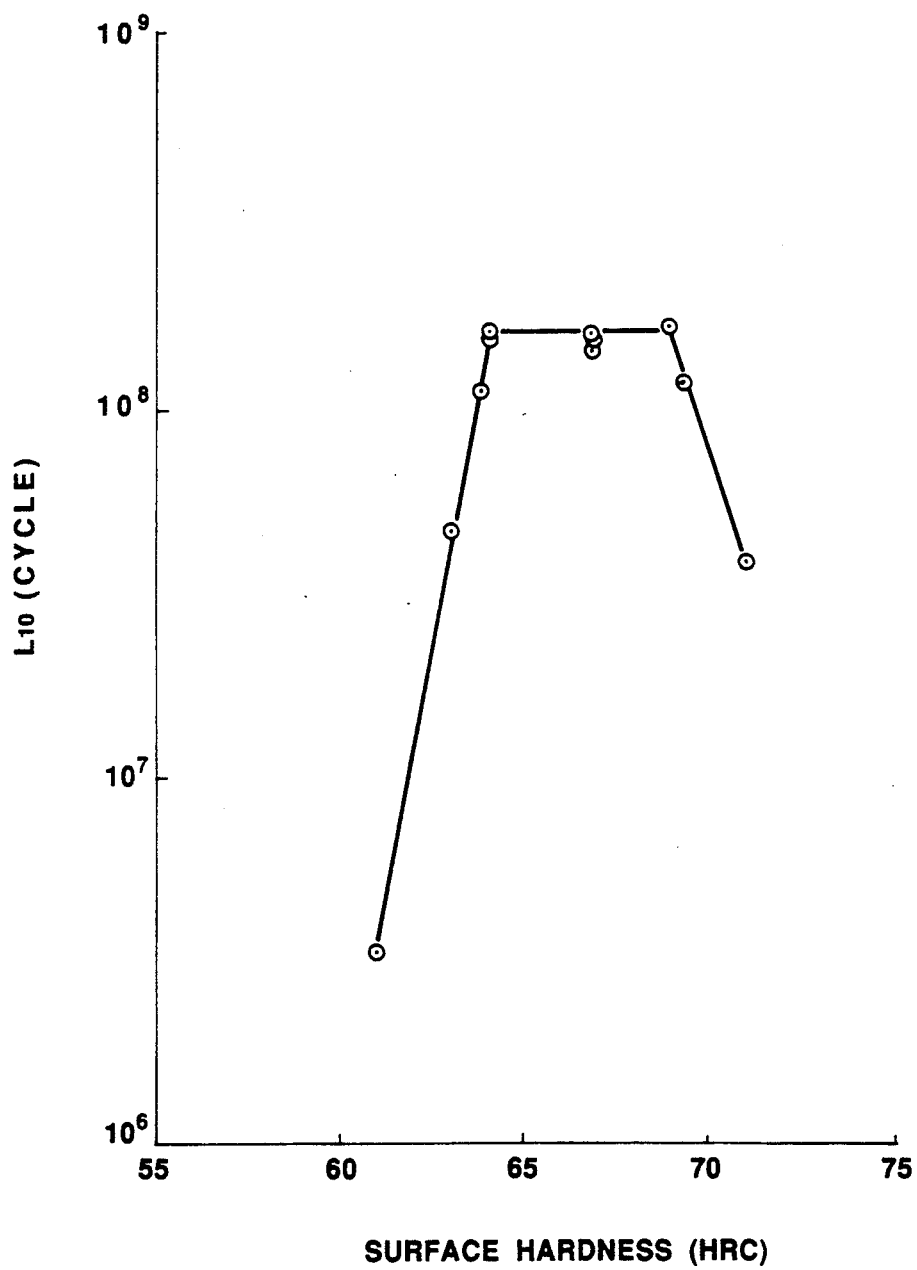
FIG. 5 is a diagram illustrating a relationship between the life of a test specimen and the surface hardness of the test specimen.

Table 5 shows the results for the foregoing. The diameter for the greatest carbide converted as that of a circle present as far as the depth within 2% of the rolling element (ball) was equal to or less than 6 μm. FIG. 5 shows a relationship between $L_{10}$ life and the surface hardness of test specimens used for the life test in which the diameter of the greatest carbide converted as that of a circle present as far as the depth of equal to or less than 2% of the diameter of the rolling element (=ball) is equal to or less than 6μm and the thickness of the surface with equal to or greater than 60 HRC is more than 2% of the ball diameter.

In Table 5, the calculations were made assuming the ball diameter was 9.525 mm.

TABLE 5

| Steel Species | HRC | Thickness of the surface layer with greater than 60 HRC | | Diameter of the greatest carbide converted as circle present to a depth within 2% of the ball diameter (μm) | $L_{10}$ life (cycle) | Surface C % |
|---|---|---|---|---|---|---|
| | | (mm) | % to ball diameter | | | |
| 1 | 61.0 | 0.42 | 4.4 | 1.4 | 3.31 × 10$^6$ | 1.0 |
| 2 | 64.1 | 0.24 | 2.5 | 1.8 | 1.58 × 10$^8$ | 2.2 |
| 3 | 68.9 | 0.88 | 9.2 | 5.9 | 1.71 × 10$^8$ | 1.7 |
| 4 | 69.3 | 0.91 | 9.6 | 5.5 | 1.20 × 10$^8$ | 2.5 |
| 5 | 71.0 | 0.90 | 9.4 | 4.9 | 3.98 × 10$^7$ | 2.5 |

TABLE 5-continued

| Steel Species | HRC | Thickness of the surface layer with greater than 60 HRC | | Diameter of the greatest carbide converted as circle present to a depth within 2% of the ball diameter (μm) | $L_{10}$ life (cycle) | Surface C % |
|---|---|---|---|---|---|---|
| | | (mm) | % to ball diameter | | | |
| 6 | 63.8 | 0.20 | 2.1 | 5.9 | $1.15 \times 10^8$ | 2.5 |
| 7 | 66.8 | 0.21 | 2.2 | 4.8 | $1.48 \times 10^8$ | 2.6 |
| 8 | 66.9 | 0.50 | 5.2 | 5.9 | $1.57 \times 10^8$ | 2.6 |
| 9 | 66.8 | ∞ | ∞ | 5.8 | $1.62 \times 10^8$ | 2.7 |
| 10 | 64.1 | 1.01 | 10.6 | 3.5 | $1.64 \times 10^8$ | 1.7 |
| 11 | 63.0 | 0.29 | 3.0 | 2.1 | $4.79 \times 10^7$ | 1.9 |
| 12 | 66.5 | 0.29 | 3.0 | 6.2 | $1.31 \times 10^8$ | 2.3 |
| 13 | 66.0 | 0.43 | 4.5 | 10.8 | $4.01 \times 10^7$ | 2.5 |
| 14 | 66.0 | 0.52 | 5.5 | 16.0 | $8.22 \times 10^6$ | 2.7 |
| 15 | 66.7 | 0.18 | 1.9 | 4.7 | $8.04 \times 10^7$ | 2.6 |
| 16 | 66.8 | 0.15 | 1.6 | 5.0 | $1.11 \times 10^7$ | 2.4 |

From FIG. 5, it can be seen that the life ($L_{10}$) of the specimen is maximum when the surface hardness is within a range equal to or greater than 64 and equal to or less than 69 in HRC.

Figure 6:
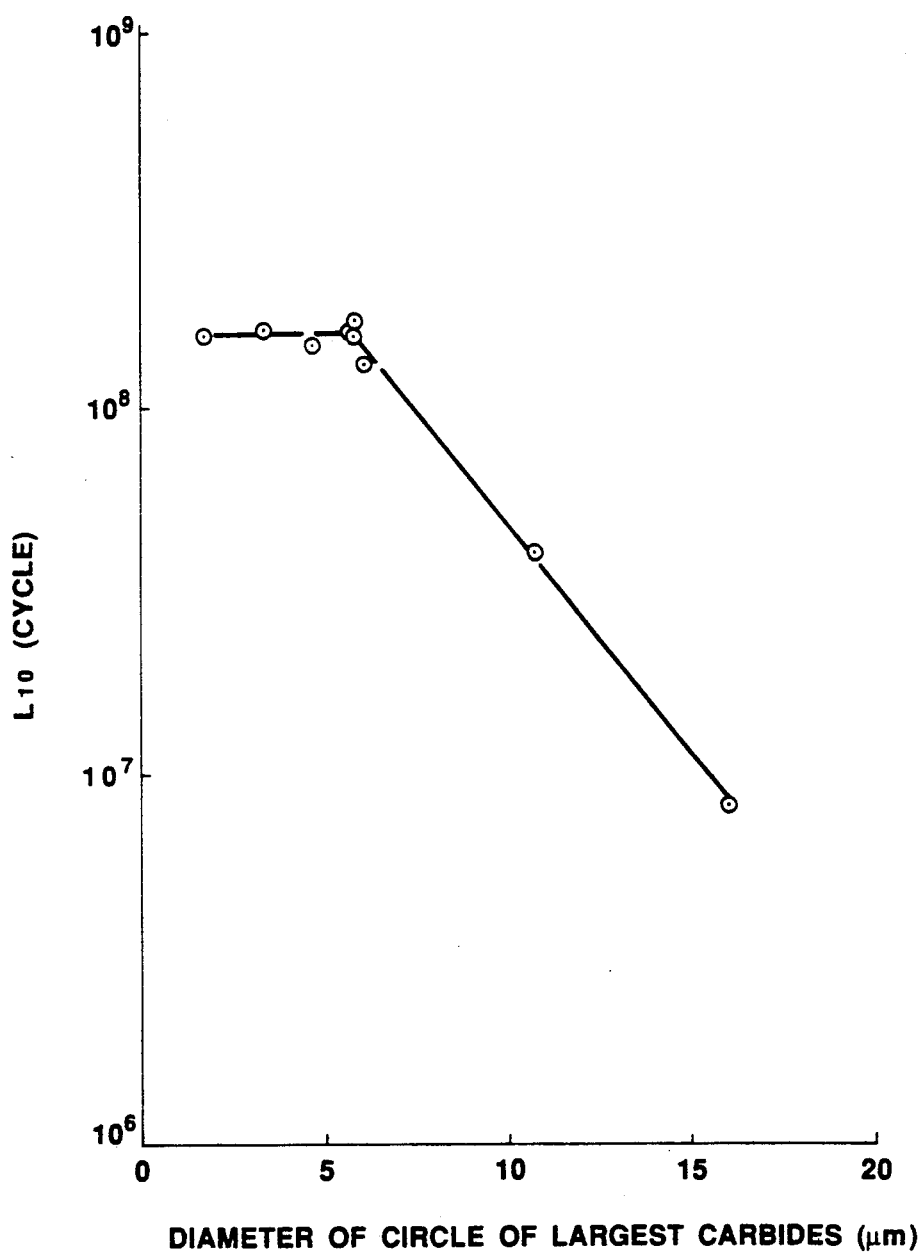
FIG. 6 is a diagram illustrating a relationship between a life of the test specimen and a diameter of the greatest carbide converted as the diameter of a circle.

FIG. 6 shows a relationship between the life ($L_{10}$) of the specimen used for the life test in which the surface hardness is equal to or greater than 64 and equal to or less than 69 in HRC and the thickness of the surface having a hardness of equal to or greater than 60 HRC is greater than 2% of the mean diameter of the rolling element and the diameter of the greatest carbide converted as that of a circle present as far as the depth within 2% of the means diameter of the rolling element.

From FIG. 6, it can be seen that although the life ($L_{10}$) of the test specimen is increased as the diameter of the greatest carbide converted as that of a circle is decreased, the effect is saturated as the greatest carbide converted as the diameter of a circle is reduced to equal to or less than 6 μm.

Figure 7:
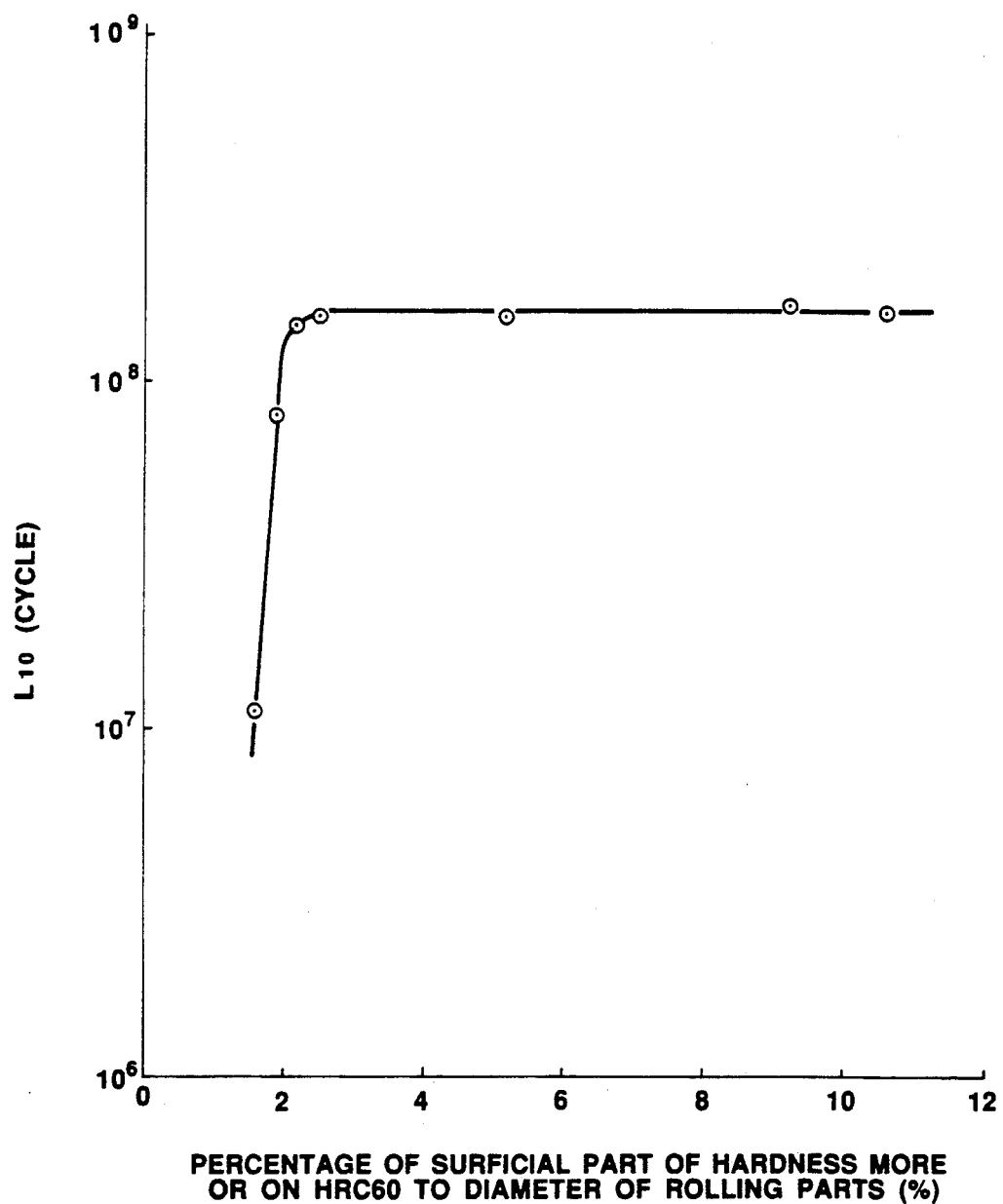
FIG. 7 is a diagram illustrating a relationship between a life of the test specimen and a percentage of a rolling element having a surface thickness equal to or greater than 60 HRC relative to a mean diameter of the rolling element.

Further, FIG. 7 shows a relationship between the life ($L_{10}$) of the test specimens in which the surface hardness is equal to or greater than 64 and equal to or less than 69 HRC and the diameter of the greatest carbide converted as the diameter of a circle present as far as the depth within 2% of the mean diameter of the rolling element, and the percentage of the thickness of the surface layer having hardness of equal to or greater than 60 HRC to the mean diameter of the rolling element.

Figure 9:
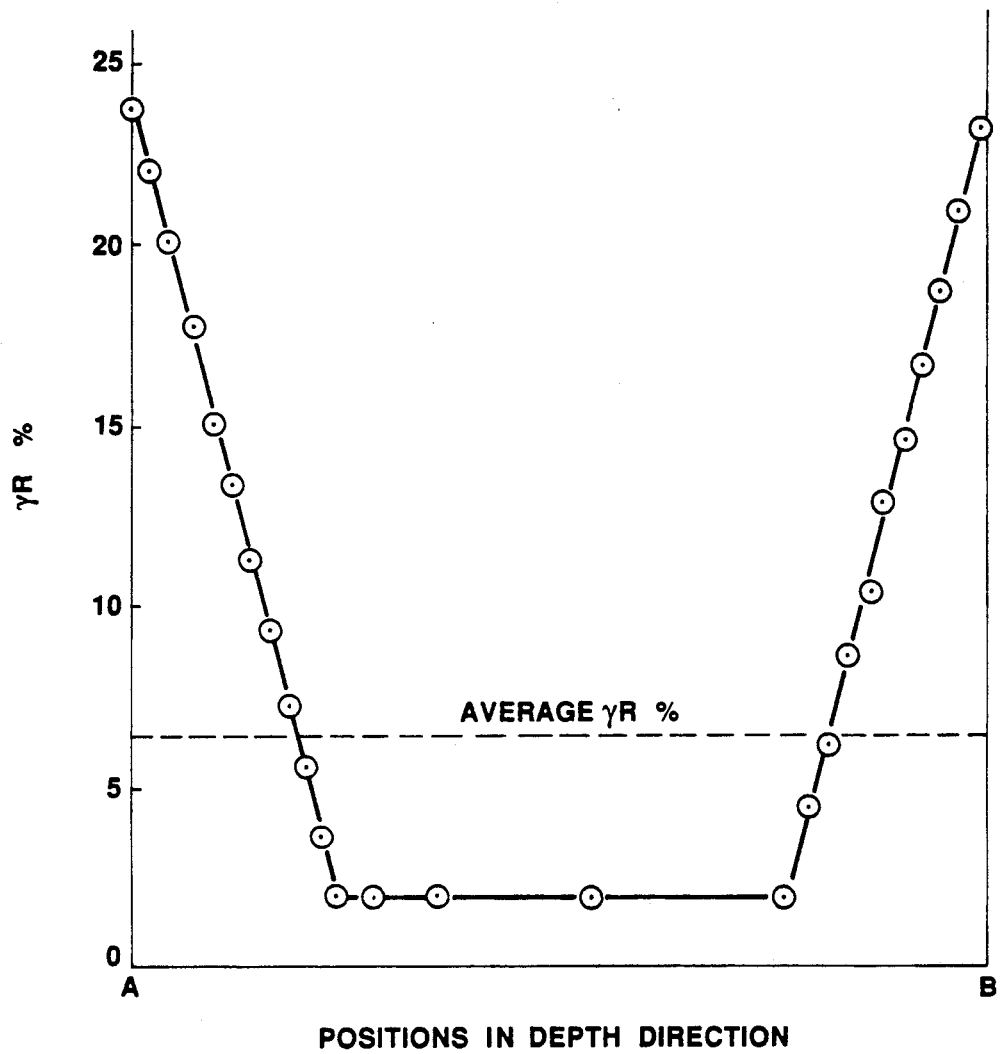
FIG. 9 is a diagram illustrating a relationship between a concentration of retained austenite and a position in the direction of the thickness in a cross section of an outer ring (AB)

From FIG. 9, it can be seen that the life ($L_{10}$) of the test specimen used for life test is reduced if the thickness of the surface layer having a hardness of equal to or greater than 60 HRC is less than 2% of the mean diameter of the rolling element.

From the foregoing, it can be seen that the life of the test specimen ($L_{10}$) reaches a maximum when the hardness of the raceway surface or the rolling contact surface is equal to or greater than 64 and equal to or less than 69 HRC, the hardness in a range from the raceway surface and the rolling contact surface toward the inside to a depth corresponding to more than 2% of the mean diameter of the rolling element is equal to or greater than 60 HRC, and the size of the carbide converted as the diameter of a circle present in a range from the raceway surface or the rolling contact surface toward the inside as far as the depth corresponding to 2% of the mean diameter of the rolling element is less than 6 μm.

EXAMPLE 3

Single row deep groove roll bearings (6206) a-n each with an outer diameter of 62 mm, a width of 16 mm and an inner diameter of 30 mm were prepared by using a plurality of speel species shown in Table 1. Heat treatment for the bearing ring and the rolling element are as shown in Table 6. The surface hardness of the bearing ring and the rolling contact surface of the single roll deep groove ball bearings were measured by the Rockwell hardness gage as described above and the difference of the hardness between both of them (surface hardness of the rolling element - surface hardness of the bearing ring = ΔHRC) was calculated. Then, a life test was conducted for each of the single row deep groove roll bearings by using an oil bath lubrication type ball bearing endurance life tester as described in "Technical Journal", edited by Nippon Seiko Co., No. 646, p 20. Test conditions for the tester were as shown below.

Radial load Fr: 1410 kgf
Maximum contact surface pressure ($P_{max}$) 350 kgf/mm$^2$
Lubricant: VG68 turbine oil
Number of rotation (inner ring rotation,
outer ring rotation): 3000 rpm The life was expressed by the accumulation time until the occurrence of recognizable flaking or a crack in 10% of the total number of the test specimens ($L_{10}$) like the case for the thrust life test described previously.

The foregoing results are shown in Table 6. Then, FIG. 8 shows a relationship of the difference of the surface hardness (ΔHRC) between the rolling element and the bearing ring relative to the $L_{10}$ life.

Figure 8:
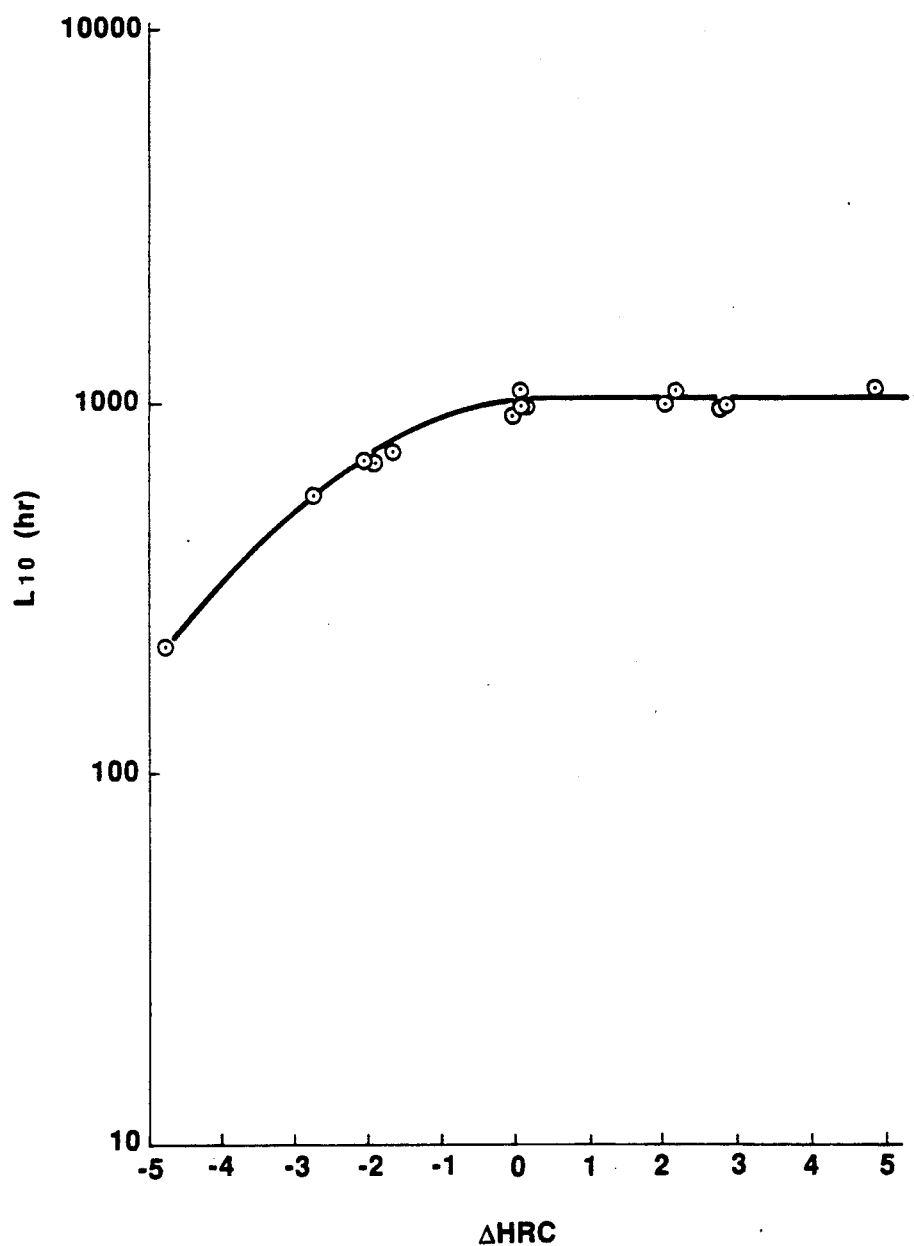
FIG. 8 is a diagram illustrating a relationship between the life and $\Delta$HRC of the test specimen.

As is apparent from FIG. 8, flaking occurred at the surface of the rolling element when ΔHRC was less than zero, to lower the life of the test specimen. On the other hand, it was confirmed that flaking did not occur in the rolling element and $L_{10}$ was maintained substantially constant when ΔHRC>0.

From the foregoing facts, it was confirmed that the life of the test specimen was improved by making the hardness of the rolling contact surface greater than that of the raceway surface.

TABLE 6

| Bearing No. | Inner, outer ring | | | Rolling element | | | ΔHRC | $L_{10}$ (hr) |
|---|---|---|---|---|---|---|---|---|
| | Steel species | Heat treatment | Surface hardness | Steel species | Heat treatment | Surface hardness | | |
| a | B | Same as (1) in Table 4 | 64.1 | B | Same as (1) in Table 4 | 64.1 | 0 | 1002 |
| b | ↑ | ↑ | ↑ | C | Same as (2) in | 68.9 | 4.8 | 1150 |

TABLE 6-continued

| Bearing No | Inner, outer ring | | | Rolling element | | | ΔHRC | $L_{10}$ (hr) |
|---|---|---|---|---|---|---|---|---|
| | Steel species | Heat treatment | Surface hardness | Steel species | Heat treatment | Surface hardness | | |
| c | ↑ | ↑ | ↑ | G | Same as (3) in Table 4 | 66.8 | 2.7 | 999 |
| d | ↑ | ↑ | ↑ | H | Same as (4) in Table 4 | 66.9 | 2.8 | 1014 |
| e | C | Same as (2) in Table 4 | 68.9 | B | Same as (1) in Table 4 | 64.1 | −4.8 | 220 |
| f | ↑ | ↑ | ↑ | C | Same as (2) in Table 4 | 68.9 | 0 | 1101 |
| g | ↑ | ↑ | ↑ | G | Same as (3) in Table 4 | 66.8 | −2.1 | 720 |
| h | ↑ | ↑ | ↑ | H | Same as (4) in Table 4 | 66.9 | −2.0 | 699 |
| i | G | Same as (3) in Table 4 | 66.8 | B | Same as (1) in Table 4 | 64.1 | −1.7 | 740 |
| j | ↑ | ↑ | ↑ | C | Same as (2) in Table 4 | 68.9 | 2.1 | 1100 |
| k | ↑ | ↑ | ↑ | H | Same as (4) in Table 4 | 66.9 | 0.1 | 1001 |
| l | H | Same as (4) in Table 4 | 66.9 | B | Same as (1) in Table 4 | 64.1 | −2.8 | 565 |
| m | ↑ | ↑ | ↑ | C | Same as (2) in Table 4 | 68.9 | 2.0 | 1015 |
| n | ↑ | ↑ | ↑ | G | Same as (3) in Table 4 | 66.8 | −0.1 | 940 |

(1) . . . T.P. No. 2
(2) . . . T.P. No. 3
(3) . . . T.P. No. 7
(4) . . . T.P. No. 8
ΔHRC . . . Difference of hardness between rolling element and inner and outer rings

EXAMPLE 4

Outer rings for the single row deep groove roll bearings (6206) described above were manufactured under heat treatment conditions shown in Table 7 by using the steel species G in Table 1. For comparison, SUJ-2 was used and outer rings for the single row deep groove roll bearings (6206) were manufactured in the same manner as described above by applying hardening without carburizing.

In this case, each of the outer rings was manufactured such that the hardness of the raceway surface was equal to or greater than 64 and equal to or less than 69 HRC, the hardness in a range from the raceway surface toward the inside as far as the depth corresponding to greater than 2% of the mean diameter of the rolling element was greater than 60 HRC, and the size of carbides converted as a diameter of a circle present in a range from the raceway surface toward the inside as far as a depth corresponding to 2% of the mean diameter of the rolling element was equal to or less than 6 μm.

Then, the average concentration of the retained austenite (% by volume) in the outer ring was measured for each of the outer rings after the heat treatment. The results of the measurements are shown in Table 7.

Figure 10:
FIG. 10 is a cross sectional view of an outer ring.

FIG. 9 shows, based on the results of Table 7, a relationship between the concentration of the retained austenite and the position (A-B) along the direction of the thickness in the cross section of the outer ring. Further, FIG. 10 is a cross sectional view for the outer ring No. 1 in which points A and B correspond to the points A and B on the abscissa in FIG. 9.

The concentration of the retained austenite is higher at the surface and lower at the inside of the outer ring. The average concentration of the retained austenite means the entire average for the concentration of the retained austenite at the surface and the inside and about 6.4 vol% is the average concentration of the retained austenite in FIG. 9.

The change of the diameter with time for the outer ring (expansion coefficient of the outer diameter for the outer ring) was measured while maintaining each of the outer rings No. 1 through No. 5 at 170° C. respectively. The results are shown in FIG. 11.

Figure 11:
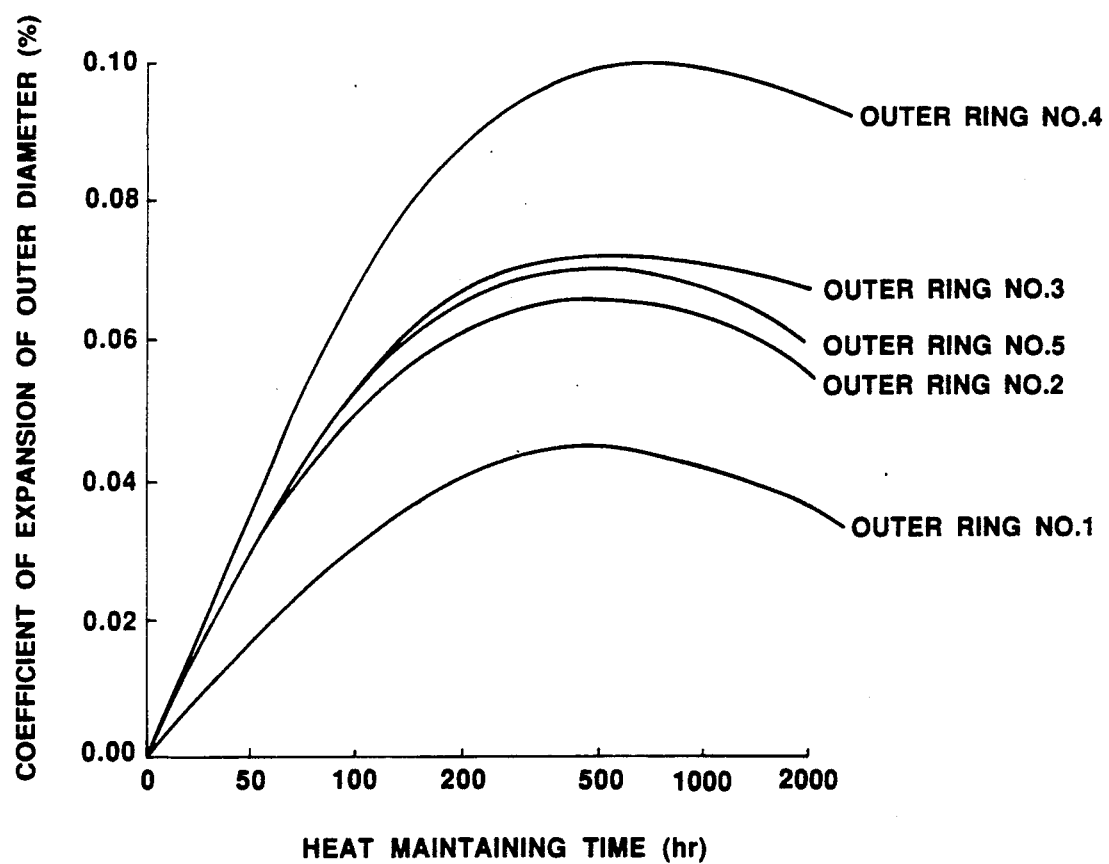
FIG. 11 is a diagram illustrating a relationship between a heat expansion coefficient of an outer diameter of the outer ring and a heat processing time.

It can be seen from FIG. 11 that the specimen (outer ring No. 1 and No. 2) with the average concentration of the retained austenite less than the value for the SUJ-2 (outer ring No. 5) (10%) has the maximum expansion coefficient of the outer diameter for the outer ring smaller than that of SUJ-2 (outer ring No. 5). From the results, when the average concentration of the retained austenite remaining in the outer ring is reduced to less than 10% by volume, steels with better dimensional stability than SUJ-2 can be obtained.

TABLE 7

| Outer ring No. | Steel species | Heat treatment method | | | | Average $\gamma\eta\%$ |
|---|---|---|---|---|---|---|
| 1 | G | Ion carburizing hardening 950° C. × | (Carburizing 2 hr + diffusion 1 hr) | Secondary carburizing 900° C. × 0.5 hr, | Tempering 180° C. × 2 hr | 6.4 |
| 2 | G | ↑ | ↑ | (Carburizing 4 hr + diffusion 2 hr) | Secondary carburizing 900° C. × 0.5 hr, | Tempering 180° C. × 2 hr | 9.5 |
| 3 | G | ↑ | ↑ | (Carburizing 6 hr + diffusion 3 hr) | Secondary carburizing | Tempering 180° C. × 2 hr | 10.6 |

TABLE 7-continued

| Outer ring No. | Steel species | Heat treatment method | | | Average $\gamma\eta\%$ |
|---|---|---|---|---|---|
| 4 | G | ↑ ↑ | (Carburizing 12 hr + diffusion 6 hr) | 900° C. × 0.5 hr. Secondary carburizing 900° C. × 0.5 hr. Tempering 180° C. × 2 hr | 15.2 |
| 5 | SUJ2 | Hardening 840° C. × 0.5 hr | | Tempering 180° C. × 2 hr | 10.0 |

Although hardening was applied in the foregoing example by oil hardening, water hardening may be applied.

In addition, the steel species are not limited to those described in Table 1 provided that the surface hardness and the diameter of carbides can be adjusted to the characteristic values of the present invention.

As has been described above, in the rolling bearing according to the present invention, since at least one of a bearing ring and a rolling element comprises an alloy steel, wherein:

the hardness of a surface layer over a thickness corresponding to greater than 2% of a mean diameter of a rolling element is equal to or greater than 60 HRC and the hardness at least of the raceway surface or the rolling contact surface is equal to or greater than 64 and equal to or less than 69 HRC, and carbides of equal to or greater than 6 μm converted as the diameter of a circle are not contained in a range from the raceway surface or the rolling contact surface as far as the depth corresponding to 2% of the mean diameter of the rolling element, a rolling bearing of long life can be provided.

Further, a rolling bearing of long life can be provided by making the surface hardness of the rolling contact surface greater than that of the raceway surface to increase the fatigue resistance of the rolling element.

Furthermore, a rolling bearing of long life can be provided by controlling the content for each of the alloy elements such that the maximum diameter of the carbides is 6 μm.

Furthermore, a rolling bearing of long life and excellent dimensional stability can be provided by controlling the average concentration of retained austenite to less than 10 vol% in at least one of the bearing ring and the rolling element.

What is claimed is:

1. An improvement in a rolling bearing in which at least one of a bearing ring having a raceway surface and a rolling element having a rolling contact surface is formed of an alloy steel, the improvement comprising:
   (a) the hardness of a surface layer over a thickness corresponding to greater than 2% of a mean diameter of a rolling element being equal to or greater than 60 HRC and the hardness at least one of the raceway surface and the rolling contact surface being equal to or greater than 64 and equal to or less than 69 HRC, and
   (b) carbides of equal to or greater than 6 μm converted as the diameter of a circle are not contained in a range from the raceway surface or the rolling contact surface as far as the depth corresponding to 2% of the mean diameter of the rolling element.

2. The improvement in a rolling bearing as defined in claim 1 wherein the hardness of the rolling contact surface is greater than that of the raceway surface.

3. The improvement in a rolling bearing as defined in claim 2 wherein an ion carburizing treatment is applied to at least one of the bearing ring and the rolling element.

4. The improvement in a rolling bearing as defined in claim 2 wherein a relationship of the content (% by weight) of alloy elements contained in the alloy steel comprises: $(\%C) \leq 1.12 \exp(-4.78 \times 10^{-2}((\%Cr)+(\%Mo)+(\%V)+0.5(\%W)+0.2(\%Mn)+0.01(\%Co)))$ 5. The improvement in a rolling bearing as defined in claim 2 wherein the average concentration of retained austenite in at least one of the bearing ring and the rolling element is less than 10%.

6. The improvement in a rolling bearing as defined in claim 1 wherein a relationship of the content (% by weight) of alloy elements contained in the alloy steel comprises:
$(\%C) \leq 1.12 \exp(-4.78 \times 10^{-2}((\%Cr)+(\%Mo)+(\%V)+0.5(\%W)+0.2(\%Mn)+0.01(\%Co)))$ 7. The improvement in a rolling bearing as defined in claim 6 wherein an ion carburizing treatment is applied to at least one of the bearing ring and the rolling element.

8. The improvement in a rolling bearing as defined in claim 6 wherein the average concentration of retained austenite in at least one of the bearing ring and the rolling element is less than 10%.

9. The improvement in a rolling bearing as defined in claim 1 wherein an ion carburizing treatment is applied to at least one of the bearing ring and the rolling element.

10. The improvement in a rolling bearing as defined in claim 1 wherein the average concentration of retained austenite in at least one of the bearing ring and the rolling element is less than 10%.

11. The improvement in a rolling bearing as defined in claim 10 wherein an ion carburizing treatment is applied to at least one of the bearing ring and the rolling element.

* * * * *